(12) United States Patent
Hillery

(10) Patent No.: US 11,600,159 B2
(45) Date of Patent: *Mar. 7, 2023

(54) SMOKE ALARM SYSTEM

(71) Applicant: Thomas H. Hillery, Henderson, NV (US)

(72) Inventor: Thomas H. Hillery, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,094

(22) Filed: Nov. 9, 2021

(65) Prior Publication Data

US 2022/0301405 A1 Sep. 22, 2022

Related U.S. Application Data

(63) Continuation of application No. 17/207,588, filed on Mar. 19, 2021, now Pat. No. 11,170,621.

(51) Int. Cl.
*G08B 17/10* (2006.01)
*H02J 7/00* (2006.01)

(52) U.S. Cl.
CPC ............ *G08B 17/10* (2013.01); *H02J 7/0069* (2020.01)

(58) Field of Classification Search
CPC .............................. G08B 17/10; H02J 7/0069
See application file for complete search history.

(56) References Cited

U.S. PATENT DOCUMENTS

| 5,410,299 A * | 4/1995 | Hard .................. G08B 17/10 340/630 |
| 6,384,724 B1 * | 5/2002 | Landais .................. G08B 6/00 340/407.1 |
| 9,965,935 B2 * | 5/2018 | Palmer .................. H02J 9/061 |
| 9,966,791 B2 * | 5/2018 | Palmer .................. H02J 7/35 |
| 2004/0032335 A1 * | 2/2004 | Parrish .................. G08B 29/145 340/628 |
| 2007/0103330 A1 * | 5/2007 | McGrath .............. G08B 29/181 340/693.1 |
| 2018/0247521 A1 * | 8/2018 | Palmer .................. H02J 7/35 |

* cited by examiner

*Primary Examiner* — Ojiako K Nwugo
(74) *Attorney, Agent, or Firm* — Newman Law, LLC

(57) ABSTRACT

A smoke detector alarm system configured with improvements that enable remotely positioning a smoke detector battery from a smoke detector while recharging the battery such that there is not a loss of battery power in case of a power outage and the battery replacement needs are reduced.

15 Claims, 4 Drawing Sheets

SMOKE ALARM SYSTEM

BACKGROUND OF THE INVENTION

The invention relates generally to detectors and alarms, such as the types which are installed in residential homes and use a disposable battery as either the sole or as backup power, and more particularly, to residential smoke detectors which use disposable batteries as the sole or backup power.

Batteries are used either as sole or as backup power for residential smoke detectors. Some rely on 9-volt disposable batteries. When the battery is exhausted, a battery-powered smoke detector becomes inactive, both in instances where the battery is the sole power source and where the battery provides backup power, if there is an outage in the household electrical supply or interruption to the electrical supply or wiring connected to the smoke detector. Accordingly, regular testing of the battery is recommended. A "test" button on the detector can be pressed to test the battery. Most smoke detectors also emit an audible "chirp" sound repeatedly when the battery is low. Smoke detectors are often hard-wired to the household electrical supply within Smoke detectors are almost always mounted on ceilings or high up on walls, which makes accessing the device require the use of a ladder or a chair. This can be a hassle for most individuals, but is very difficult and even dangerous for some people, particularly individuals who are elderly, disabled, mobility-impaired, suffer from conditions that affect sense of balance, etc. Indeed, standing on an elevated surface while trying to reach upward to manipulate a smoke detector creates an inherent risk of falling and sustaining injury.

Perhaps for the above reasons it has been found that battery-powered smoke detectors in many houses have dead batteries. According to the US National Fire Protection Association's (NFPA) January 2019 report entitled "Smoke Alarms in U.S. Home Fires", 17% of home fire deaths resulted from smoke alarms that were not working. The report also revealed that in fires in which the smoke alarms were present but did not operate, 43% of the smoke alarms had missing or disconnected batteries, and dead batteries are the cause of 25% of the smoke alarm failures.

In response public information campaigns have been created to remind people to change smoke detector batteries regularly. For example, in regions using daylight saving time, campaigns may suggest that people change their batteries when they change their clocks or on a birthday.

The NFPA recommends that home-owners replace smoke detector batteries with a new battery at least once per year, when it starts chirping to signal that the battery is low, or when it fails a test, which the NFPA recommends to be carried out at least once per month.

It is evident that many individuals are not regularly testing or changing the batteries in their detectors. Accordingly, there is a need for improvement and solution to address the aforementioned issues that make the detector battery testing and changing process cumbersome, difficult and dangerous.

SUMMARY OF THE INVENTION

The invention is generally directed to improvements in existing fire and smoke alarm systems.

In some embodiments, the invention is directed to an improvement to a smoke detector alarm system configured for remotely positioning a smoke detector battery from a smoke detector, the smoke detector alarm system including: a support housing including a battery module having a battery receiving portion configured to non-permanently retain the smoke detector battery therein in contact with a first set of electrical connectors disposed in the battery receiving portion, the first set of electrical connectors forming an electrical connection with the battery; a first plurality of wires having a first end for connecting to the electrical connectors in the battery module; and a second end for connecting to a second set of electrical connectors in a smoke detector, wherein the first plurality of wires have a sufficient length to permit the battery module to be disposed remotely from the smoke detector for convenient monitoring and replacement of the smoke detector battery, the improvement to the smoke detector alarm system comprising: a second plurality of wires electrically connected to the first set of electrical connectors and an electrical power supply, wherein the second plurality of wires provide electrical power sufficient to monitor, test and recharge the power of the battery; and the battery being a rechargeable battery.

In some embodiments, one of a light switch and an electrical socket is disposed within the support housing adjacent to the battery receiving portion.

In some embodiments, the support housing comprises an electrical junction box.

In some embodiments, a wall plate is configured to cover the support housing. In some embodiments, the wall plate further comprises a hinged door covering the battery receiving portion.

In some embodiments, the battery module further comprises a communication device in connection with the battery configured to provide a communication relating to the monitoring, testing and recharging status of power associated with the battery.

Some embodiments of the invention are directed to an improvement to a smoke detector alarm system configured for remotely positioning a smoke detector battery from a smoke detector, the smoke detector alarm system including: a support housing including a battery module having a battery receiving portion configured to non-permanently retain the smoke detector battery therein in contact with a first set of electrical connectors disposed in the battery receiving portion, the first set of electrical connectors forming an electrical connection with the battery; a first plurality of wires having a first end for connecting to the electrical connectors in the battery module; and a second end for connecting to a second set of electrical connectors in a smoke detector, wherein the first plurality of wires have a sufficient length to permit the battery module to be disposed remotely from the smoke detector for convenient monitoring and replacement of the smoke detector battery, the improvement to the smoke detector alarm system comprising: a second plurality of wires electrically connected to the first set of electrical connectors and an electrical power supply, wherein the second plurality of wires provide electrical power sufficient to monitor, test and recharge the battery; the battery being a rechargeable battery; and a data communication device in connection with the battery configured to wirelessly transmit a communication relating to the monitoring, testing and recharging status of power associated with the battery.

Other embodiments, features and advantages of the invention will be readily appreciated and apparent from the following detailed description when considered in connection with the accompanying drawings.

BRIEF DESCRIPTION OF THE DRAWINGS

Various advantages of the invention will be readily appreciated as the same becomes better understood by reference to the following detailed description when considered in connection with the accompanying drawings. The components in the figures are not necessarily to scale, emphasis instead being placed upon illustrating the principles of the invention.

DETAILED DESCRIPTION OF THE INVENTION

The following detailed description provides exemplary embodiments of alerting devices, such as smoke alarm devices. It will be readily understood from the description of the embodiments of the invention herein, and the elements thereof, could be alternatively configured within the scope of the invention. This description is therefore intended to generally describe and illustrate examples of the invention but is not intended to limit the scope of the invention to the examples, embodiments and elements described herein.

Figure 1:
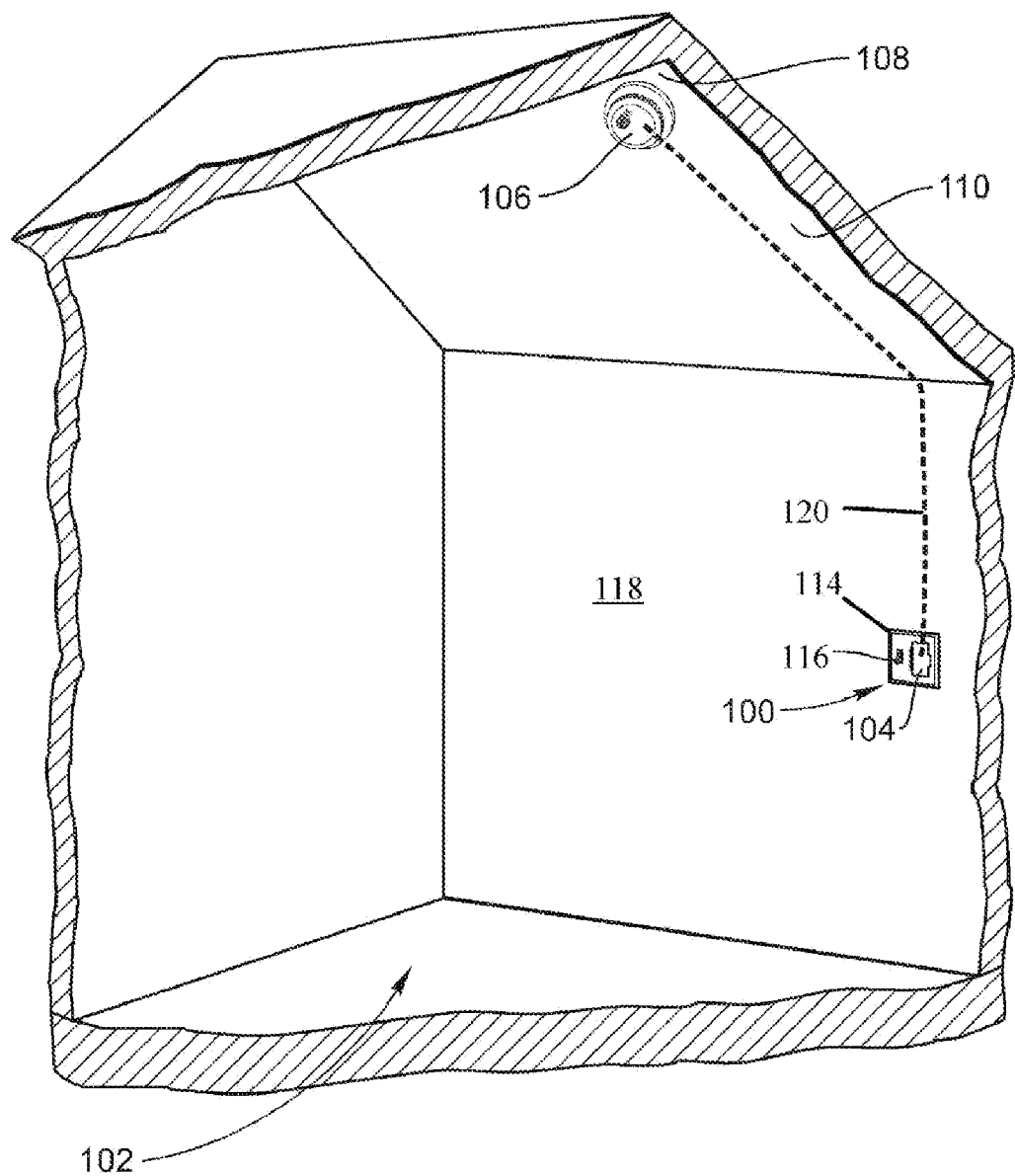
FIG. 1 is a perspective view of a system constructed in accordance with an embodiment of the invention.
Figure 2:
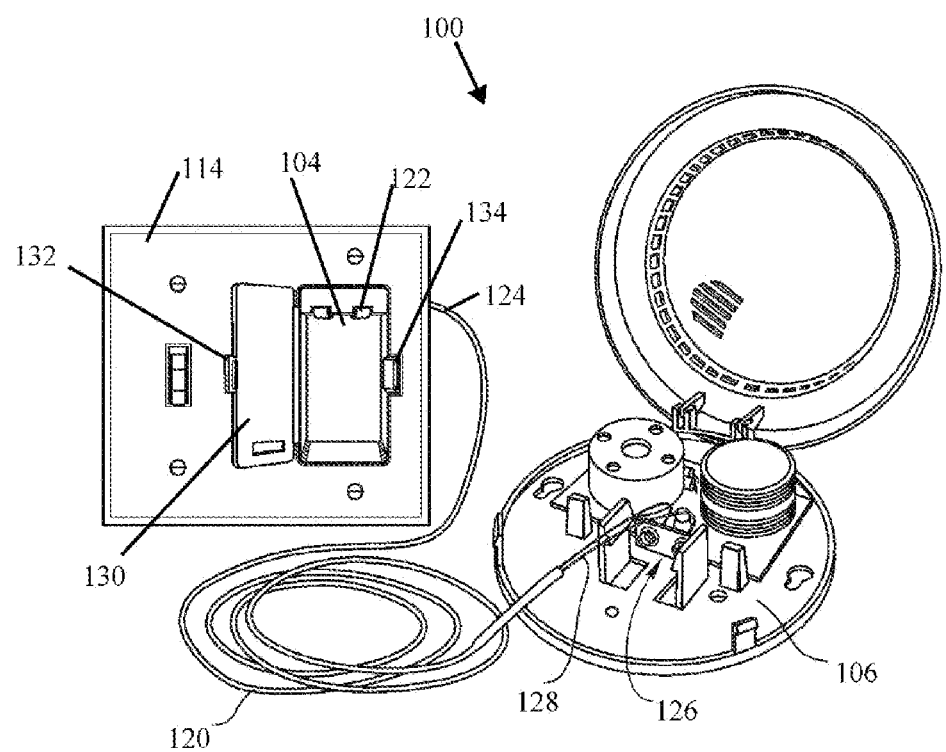
FIG. 2 is depicts front and perspective views of certain elements of a system of the embodiment of the invention shown in FIG. 1.
Figure 3:
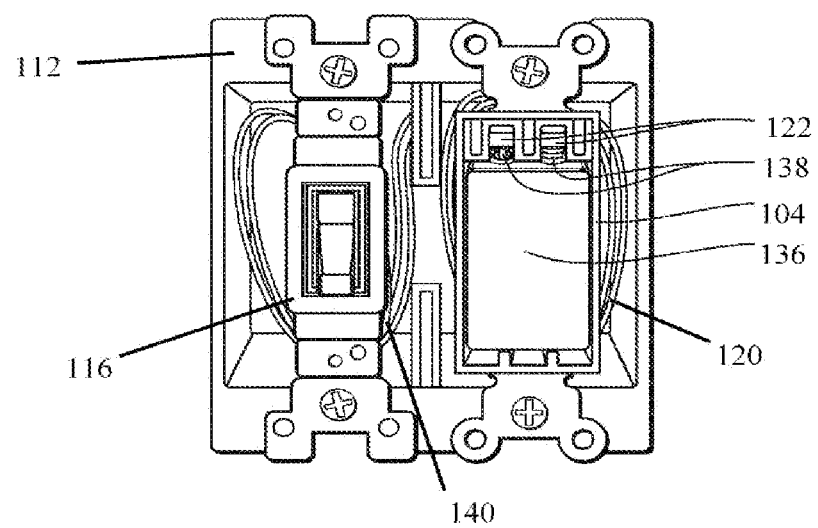
FIG. 3 illustrates a front schematic view of the embodiment of the system shown in FIG. 1 illustrating in particular certain electrical connections.

FIGS. 1-3 illustrates a fire/smoke alarm system 100 installed within a room 102 of a home. It should be understood that system 100 may be used in any building used for any purpose, including residential and commercial use. System 100 includes a battery module 104 that is disposed remotely from a smoke detector 106. In particular, battery module 104 is mounted at an easily accessible location of the home which does not require a ladder, stool or effort to reach. The smoke detector 106 is attached to an upper portion 108 of a vaulted ceiling 110 of the room 102. By being positioned on the upper portion 108 of the vaulted ceiling 110, the smoke detector 106 is optimally positioned for quickly detecting smoke but is more difficult to access, especially to install or replace a battery.

In this embodiment of the invention battery module 104 is connected at an electrical junction box 112 including a wall plate 114 covering junction box 112. It should be understood that the wall plate may be any shape, and may be shaped to accommodate light switches and/or electrical outlets. While a light switch 116 is shown for illustrative purposes, it should be understood from the description herein that junction box 112 is intended to receive electrical power from electrical lines supplying electricity to the home, such as from a utility power or generator supplying electrical power to and within the home and/or room 102, and therefore may also have one or more light switches and/or electrical outlets or be dedicated to providing electrical communication with battery module 104.

The configuration shown enables battery module 104 to be attached to a wall 118 of room 102 at the height normally provided for light switches, which is a substantially more conveniently accessible location than the location of smoke detector 106. Battery module 104 is in electrical communication with smoke detector 106 via wires 120, shown in phantom lines, which electrically connect battery module 104 with smoke detector 106. It should be readily apparent that wires 120 may be extended over the exposed side of wall 118 and ceiling 110 or through the unexposed side of wall 118 and ceiling 110. In either case, homeowners, regardless of their physical condition, may more easily monitor, install, and change the battery for smoke detector 106.

As shown in FIG. 2, battery module 104 includes battery contacts 122 connected with wires 120 within junction box 112 hidden behind wall plate 114 and module 104. In this embodiment, contacts 122 are also in electrical communication with the electrical supply available in the home which is used to recharge a battery, such as a 9 Volt battery, connected with contacts 122 within battery module 104.

The battery holder of the battery module is shaped to retain the battery that is normally installed in the battery compartment of the smoke detector. The battery holder also includes electrical contacts that are electrically connected to the wires and are disposed to engage the terminals of the battery when held by the battery holder.

In this embodiment, wires 120, which may be covered by an insulator, electrically connect contacts 122 in battery module 104 at a first end 124 thereof, and form an electrical connection 126 with smoke detector 106 at a second end 128 thereof.

Battery module 104 is accessible through a hinged door 130 having latching mechanisms 132 and 134 for forming a non-permanent engagement that retains door 130 in a closed position. A rechargeable battery 136 having electrically conductive connectors 138 is in electrical communication with both a home or room electrical supply through wires 140 (which may be connected with the bypass connectors (not shown) of light switch 116) and smoke detector 106 through wires 120 through connectors 138 being in contact with contacts 122 in battery module 104. Thus, battery 136 is both able to power smoke detector 106 and being recharged through the connection with wires 140, which advantageously enables battery 136 to be sufficiently charged in case of a power outage and reduces the requirement to change battery 136.

In some embodiments, electrical connection 126, that is, the connection of wires 120 to smoke detector 106 at second end 128, thus providing electrical communication between battery module 104 and smoke detector 106, is facilitated by a connector disposed at end 128. The connector may be a battery-shaped body, that is, a 9-volt shaped body of the same or similar size and shape as battery 136 disposed at end 128, which is inert and not a battery (e.g., a "dummy" battery), but rather, by being of a similar size and shape, the second end 128 facilitates forming the electrical connection 126. For example, the second end 128 may include the battery-shaped body with a 9V battery snap connector for cooperating with corresponding connectors on smoke detector 106. A system of the invention may be more easily retrofitted into an existing system.

Figure 4:
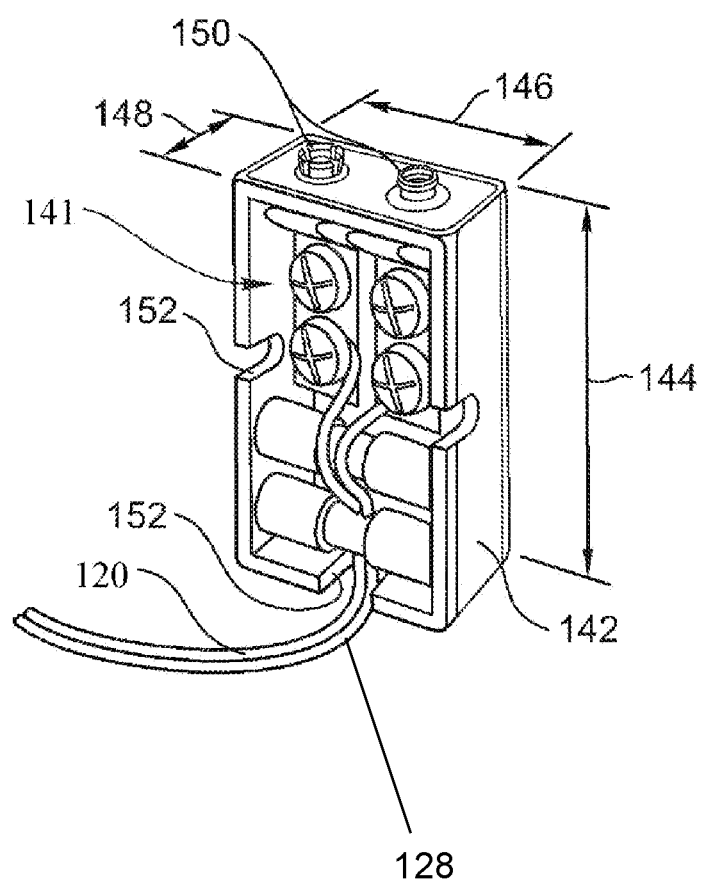
FIG. 4 is a perspective view of an exemplary embodiment of a battery-shaped electrical connector for facilitating an electrical connection with a smoke detector.

An exemplary electrical connector 141 that may be used with the system of the invention is shown in FIG. 4. The electrical connector 141 connected at second end 128 of wires 120 provides the advantage of being shaped to be installed in a wide variety of battery compartments of smoke detectors. The electrical connector 142 is dummy or pseudo-battery, simulating the dimensions of the smoke detector battery to enable the pseudo-battery to be installed in the smoke detector in place of the smoke detector battery. Specifically, the electrical connector 141 includes a structure 142 that has dimensions, length 144, width 146, and thickness 148, similar to the type of battery that is normally installed within the smoke detector 106. For example, the structure may have the dimensions of a 9V battery, an AA battery, a 123A battery, and other batteries known in the art.

The electrical connector 141 also includes two electrical contacts 150 disposed to engage the corresponding contacts of the smoke detector 106. As shown, the electrical contacts 150 are connected to the wires 120. Wires 120 may be oriented to conveniently exit the structure 142 by passing through orientation slots 152 that help to properly position and prevent damage to the wires 120 as they exit the smoke detector 106.

A system of the invention having a remote battery access device and added electrical supply for recharging the battery is therefore disclosed that enables the battery for a smoke detector and alarm system to be remotely positioned from the smoke detector, conveniently located for monitoring and maintenance of the smoke detector battery and recharged, such that the battery needs to be changed less in either backup or sole battery-powered smoke detector capacities, and is more likely to function in case of a power outage or other interruption in electrical supply for smoke detectors using a battery for backup power. The convenient positioning of the battery makes it more likely that homeowners will better monitor and maintain their alarm system in an operational state, while also advantageously enabling the alarm system to maintain the battery in a fully charged state. Thus, the remote battery access device of the invention may save lives by ensuring that the smoke alarm system functions properly to alert the home occupants in case of fire.

In case the battery fails or for some reason is not being recharged, the battery module may also include a low battery indicator using conventional circuitry that flashes a light emitting diode (LED) with similar circuitry used on currently available smoke detectors. Thus, when the smoke detector begins to emit an audible signal to indicate that the charge in a connected battery is low, the LED of the battery module will also flash to help indicate which smoke detector battery needs to be replaced. In some embodiments, the circuitry is further configured to include a data communication device to communicate wirelessly, such as through Wifi or Bluetooth technology, with a downloadable mobile application or smart home device upon detecting battery status or a battery power issue such as low power or if the battery does not appear to be recharging.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary devices, apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. An improvement to a smoke detector alarm system configured for remotely positioning a smoke detector battery from a smoke detector, the smoke detector alarm system including: a support housing including a battery module having a battery receiving portion configured to non-permanently retain the smoke detector battery therein in contact with a first set of electrical connectors disposed in the battery receiving portion, the first set of electrical connectors forming an electrical connection with the battery; a first plurality of wires having a first end for connecting to the electrical connectors in the battery module; and a second end for connecting to a second set of electrical connectors in a smoke detector, wherein the first plurality of wires have a sufficient length to permit the battery module to be disposed remotely from the smoke detector for convenient monitoring and replacement of the smoke detector battery, the improvement to the smoke detector alarm system comprising:
   a) a second plurality of wires electrically connected to the first set of electrical connectors and an electrical power supply, wherein the second plurality of wires provide electrical power sufficient to monitor, test and recharge the battery; and
   b) the battery being a rechargeable battery.

2. The improvement to a smoke detector alarm system as recited in claim 1, wherein one of a light switch and an electrical socket is disposed within the support housing adjacent to the battery receiving portion.

3. The improvement to a smoke detector alarm system as recited in claim 1, wherein the support housing comprises an electrical junction box.

4. The improvement to a smoke detector alarm system as recited in claim 3, further comprising a wall plate configured to cover the support housing.

5. The improvement to a smoke detector alarm system as recited in claim 4, wherein the wall plate further comprises a hinged door covering the battery receiving portion.

6. The improvement to a smoke detector alarm system as recited in claim 1, wherein the battery module further comprises a communication device in connection with the battery configured to provide a communication relating to the monitoring, testing and recharging status of the battery.

7. An improvement to a smoke detector alarm system configured for remotely positioning a smoke detector battery from a smoke detector, the smoke detector alarm system including: a support housing including a battery module having a battery receiving portion configured to non-permanently retain the smoke detector battery therein in contact with a first set of electrical connectors disposed in the battery receiving portion, the first set of electrical connectors forming an electrical connection with the battery; a first plurality of wires having a first end for connecting to the electrical connectors in the battery module; and a second end for connecting to a second set of electrical connectors in a smoke detector, wherein the first plurality of wires have a sufficient length to permit the battery module to be disposed remotely from the smoke detector for convenient monitoring and replacement of the smoke detector battery, the improvement to the smoke detector alarm system comprising:
   a) a second plurality of wires electrically connected to the first set of electrical connectors and an electrical power supply, wherein the second plurality of wires provide electrical power sufficient to monitor, test and recharge the battery;
   b) the battery being a rechargeable battery; and
   c) a data communication device configured to communicate the monitoring, testing and recharging status of power associated with the battery.

8. The improvement to a smoke detector alarm system as recited in claim 7, wherein the support housing comprises an electrical junction box.

9. The improvement to a smoke detector alarm system as recited in claim 7, further comprising a wall plate configured to cover the support housing.

10. The improvement to a smoke detector alarm system as recited in claim 9, wherein the wall plate further comprises a hinged door covering the battery receiving portion.

11. The improvement to a smoke detector alarm system as recited in claim 9, wherein the data communication device is mounted in the support housing.

12. The improvement to a smoke detector alarm system as recited in claim 7, wherein a light is disposed within the support housing.

13. The improvement to a smoke detector alarm system as recited in claim 12, wherein the data communication device is configured to illuminate the light responsive to the status of power associated with the battery.

14. The improvement to a smoke detector alarm system as recited in claim 7, wherein the data communication device communicates wirelessly.

15. An improved smoke detector alarm system configured for remotely positioning a smoke detector battery from a smoke detector, the improved smoke detector alarm system comprising a support housing including a battery module having a battery receiving portion configured to non-permanently retain the smoke detector battery therein in contact with a first set of electrical connectors disposed in the battery receiving portion, the first set of electrical connectors forming an electrical connection with the battery; a first plurality of wires having a first end for connecting to the electrical connectors in the battery module; and a second end for connecting to a second set of electrical connectors in a smoke detector, wherein the first plurality of wires have a sufficient length to permit the battery module to be disposed remotely from the smoke detector for convenient monitoring and replacement of the smoke detector battery, wherein:

a) a second plurality of wires is electrically connected to the first set of electrical connectors and an electrical power supply, wherein the second plurality of wires provide electrical power sufficient to monitor, test and recharge the battery;

b) the battery is a rechargeable battery; and c) a data communication device mounted in the support housing is operatively associated with the battery to communicate the monitoring, testing and recharging status of power associated with the battery.

\* \* \* \* \*